United States Patent [19]

Hirata

[11] Patent Number: 5,566,436
[45] Date of Patent: Oct. 22, 1996

[54] METHOD OF INSERTING MACHINE PARTS INTO A WORKPIECE

[75] Inventor: Yasunari Hirata, Kumamoto, Japan

[73] Assignee: Hirata Corporation, Japan

[21] Appl. No.: 289,325

[22] Filed: Aug. 11, 1994

Related U.S. Application Data

[63] Continuation of Ser. No. 102,317, Aug. 5, 1993, abandoned, which is a continuation of Ser. No. 925,792, Aug. 4, 1992, abandoned.

[30] Foreign Application Priority Data

Apr. 14, 1992 [JP] Japan .................... 4-121404

[51] Int. Cl.$^6$ ................................. B23P 21/00
[52] U.S. Cl. ............... 29/33 K; 29/468; 29/784; 29/240; 29/430; 414/744.5
[58] Field of Search .............. 29/464, 467, 468, 29/240, 428, 429, 33 K; 901/6, 8, 17, 18; 414/744.3, 744.4, 744.5

[56] References Cited

U.S. PATENT DOCUMENTS

| | | | |
|---|---|---|---|
| 3,122,866 | 3/1964 | Gross | 29/468 X |
| 3,625,093 | 12/1971 | Freiburghaus | 29/240 X |
| 3,626,573 | 12/1971 | Blake | 29/240 X |
| 3,881,605 | 5/1975 | Grossman | 901/6 X |
| 4,541,062 | 9/1985 | Kada et al. | 901/6 X |
| 4,620,831 | 11/1986 | Poncet et al. | 901/17 X |
| 4,797,061 | 1/1989 | Munakata | 414/744.5 |
| 4,887,341 | 12/1989 | Sakimori et al. | 29/771 X |
| 4,973,216 | 11/1990 | Domm | 414/744.5 |
| 5,085,556 | 2/1992 | Ohtomi | 901/18 X |

FOREIGN PATENT DOCUMENTS

55-112789  8/1980  Japan .

Primary Examiner—Timothy V. Eley
Assistant Examiner—Khan V. Nguyen
Attorney, Agent, or Firm—Majestic, Parsons, Siebert & Hsue

[57] ABSTRACT

A machine part such as a shaft is inserted or pressure-fitted into a hole in a workpiece by setting the workpiece on a table which is rotatable around at least two axes, rotating the table so as to orient the hole vertically, holding the part vertically by an assembly tool, operating a two-dimensionally moving mechanism so as to move the assembly tool within a horizontal plane and to position the part vertically above the hole, and using an elevator to move the two-dimensionally moving mechanism vertically. Since both the part and the hole are vertically aligned, no torque is generated on the part during the insertion process.

5 Claims, 8 Drawing Sheets

METHOD OF INSERTING MACHINE PARTS INTO A WORKPIECE

This is a continuation of application Ser. No. 08/102,317 filed Aug. 5, 1993, to be abandoned, which was a continuation of application Ser. No. 07/925,792 filed Aug. 4, 1992, now abandoned.

BACKGROUND OF THE INVENTION

This invention relates to a method of for assembling machine parts and, more particularly, to a method of inserting, pressing or screwing machine parts such as shafts into holes provided in a workpiece.

Figures 9, 10A, 10B, 11:
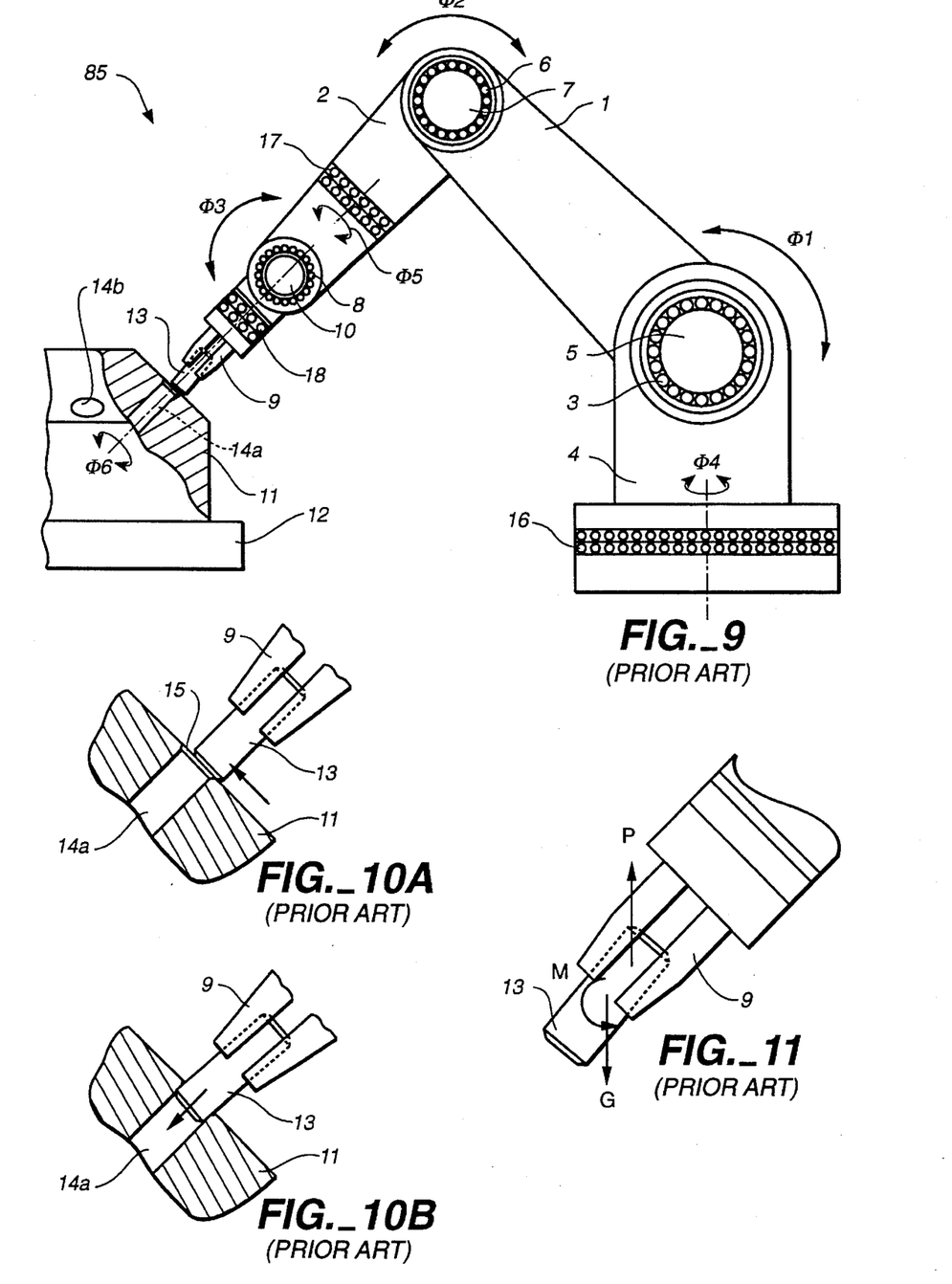
FIG. 9 is a sectional side view of a prior art apparatus.
FIGS. 10(a) and 10(b) are sectional side views of a portion of the apparatus of FIG. 9 to show its operation for inserting a part into a hole in a workpiece.
FIG. 11 is a sectional side view of a portion of the apparatus of FIG. 9 when its chuck is grasping a part obliquely.

When a machine or a device is constructed by assembling constituent parts, one of the most basic operations is for inserting a part into another such as placing a shaft into a hole or inserting a shaft through a bearing. FIG. 9 shows an example of prior art apparatus for such an operation, with a robot 85 of the type having a multiply articulated member with arms 1 and 2 adapted to move only within a vertical plane. The first arm 1 is rotatably supported at one end through a bearing 3 by a supporting member 4 and is provided with a servo motor 5 with a decelerator so as to be able to rotate in the direction of $\phi 1$. At the other end, the first arm 1 rotatably supports one end of the second arm 2 through a bearing 6. The second arm 2 can be rotated in the direction of $\phi 2$ by means of another servo motor 7 with a decelerator. The other end of the second arm 2 is attached through a bearing 8 to a chuck 9 serving as a mechanical hand rotatable in the direction of $\phi 3$ by means of still another servo motor 10 with a decelerator. The supporting member 4 itself is rotatably supported by a bearing 16 and is rotatable in the direction of $\phi 4$ by means of its own servo motor (not shown) with a decelerator. The second arm 2 is itself provided with a bearing 17 within itself so as to be additionally rotatable around the axis of its own extension in the direction of $\phi 5$ by means of still another servo motor (not shown) with a decelerator. Similarly, the chuck 9 is itself provided with a bearing 18 within itself so as to be additionally rotatable in the direction of $\phi 6$ by means of still another servo motor (not shown) with a decelerator. In FIG. 9, numeral 11 indicates a workpiece placed on a table 12.

Next, the process of installing a part 13 into the workpiece 11 will be explained with reference to FIGS. 10(*a*) and 10(*b*). The workpiece 11 may have been transported by a conveyor belt (not shown) and stopped at the specified position on the table 12. The workpiece 11 is provided with holes 14*a*, 14*b*, . . . for accepting various parts 13, each hole having a tapered section 15 at its opening part. The robot 85 is operated such that the chuck 9 picks up the part 13 from a part feeder or the like. The chuck 9 holds the part 13 at an angle according to the angle of insertion into the hole 14*a* and moves it along the surface of the workpiece 11 as shown in FIG. 10(*a*). As soon as the position of the hole 14*a* is sensed, the part 13 is aligned with the hole 14*a* and the part 13 is directly pushed into it as shown in FIG. 10(*b*) to a desired depth.

After the insertion of one part is thus completed, another part is similarly inserted into another hole. After all required parts have been inserted to the respectively corresponding holes, the workpiece 11 is carried off from the table 12 by the conveyor belt (not shown).

In the case of a hole which is not vertical, however, the part 13 will be grasped obliquely by the chuck 9 which, as shown in FIG. 11, is not vertically oriented. This generates a torque M on the part 13 between the force P from the chuck 9 and the weight G of the part 13 itself. Such a torque tends to cause a change in the direction of the part 13 with respect to the axis of the chuck 9. Thus, even if the chuck 9 is controlled to be oriented parallel to the hole 14, the part 13 does not necessarily become parallel to it and hence cannot be inserted successfully into it. Moreover, if the part 13 cannot be securely held by the chuck 9, there is an increased possibility of the part 13 falling off the chuck 9.

Since the robot 85 is of the multiply articulated type in the case of the apparatus of FIG. 9, furthermore, the rotary motions of the arms 1 and 2 and the chuck 9 must be combined together to produce a linear motion of the chuck 9 parallel to the hole 14 when the part 13 is inserted into it. This conversion of rotary motions into a linear motion requires a complicated control. In other words, the apparatus requires complicated control circuits and complicated control programming for the servo motors 5, 7, 10, etc.

With such a prior art apparatus, positional adjustments were difficult and maintenance of high accuracy in insertion was equally difficult. As a result, the part 13 would become oriented obliquely to the hole due, for example, to an operational error of the robot 85, making it impossible to be inserted reliably and stably into the intended hole.

Since large torques are generated at the joints (that is, on the bearings and the decelerators) of the robot 85 when the part 13 is inserted into a hole forcibly, furthermore, an apparatus as shown in FIG. 9 may not be adapted for press-fitting. In such a case, the robot 85 is used only for positioning the part 13 at the hole, allowing it to enter it only a little and another apparatus may be required to forcibly push the part 13 deeper into the hole 14. In other words, a single prior art apparatus could not be used for press-fitting.

It is therefore an object of the present invention to provide a method of robotically inserting a machine part such as a shaft perpendicularly into a hole in a workpiece such that the mechanism for moving assembly tools can be much simplified and hence that a part can be reliably and it without developing torque on the part stably inserted into a hole or forcibly pressed into.

SUMMARY OF THE INVENTION

A method according to the present invention for robotically assembling machine parts, by which the above and other objects can be accomplished, may be characterized as comprising the steps of holding a machine part vertically by an assembly tool, placing a workpiece on a table which is rotatable around at least two axes, rotating this table around these axes to vertically orient a hole in the workpiece, moving the assembly tool horizontally by a two-dimensionally moving mechanism so as to position the machine part directly above the hole, and moving this mechanism vertically by an elevator means to cause the part to be inserted into the hole, which are both vertically oriented.

By a method of this invention, the table can be universally rotated because it is supported rotatably around at least two axes. As a result, the workpiece placed thereon can be oriented in such a way that a specified hole therein becomes vertical. In other words, the assembly tool can be moved horizontally by the two-dimensionally moving mechanism so as to bring the vertically held part to a position above the workpiece, lowered by means of the vertically moving elevator mechanism and inserted into the hole by the force of the downward motion of the assembly tool.

Since the part is held vertically by the assembly tool at the time of its insertion, no torque will be generated on the part by its own weight and the part can be held securely by the assembly tool. As a result, the part is less likely to fall off the assembly tool and the part can be inserted more securely and reliably.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
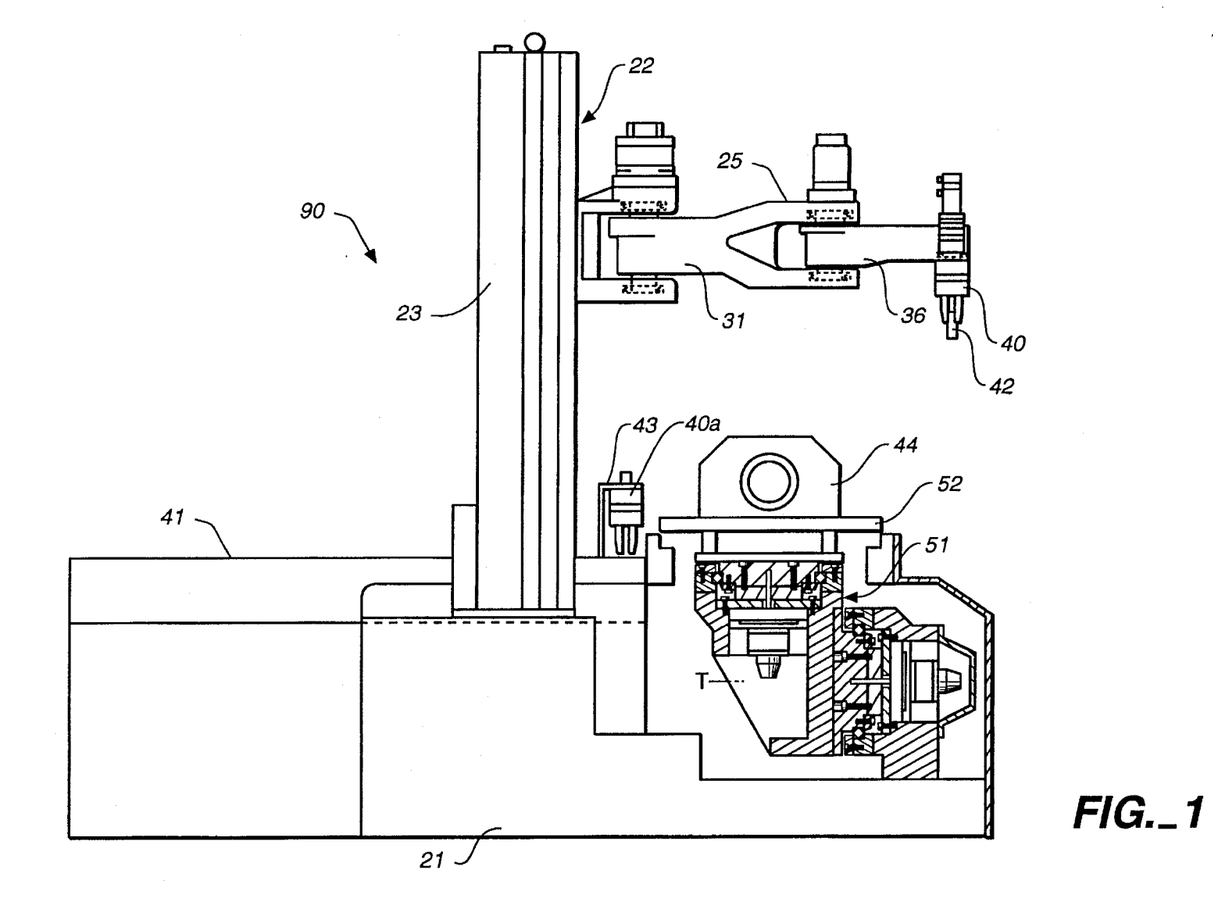
FIG. 1 is a partially sectional side view of an apparatus which may be used in a method embodying the present invention.
Figure 2:
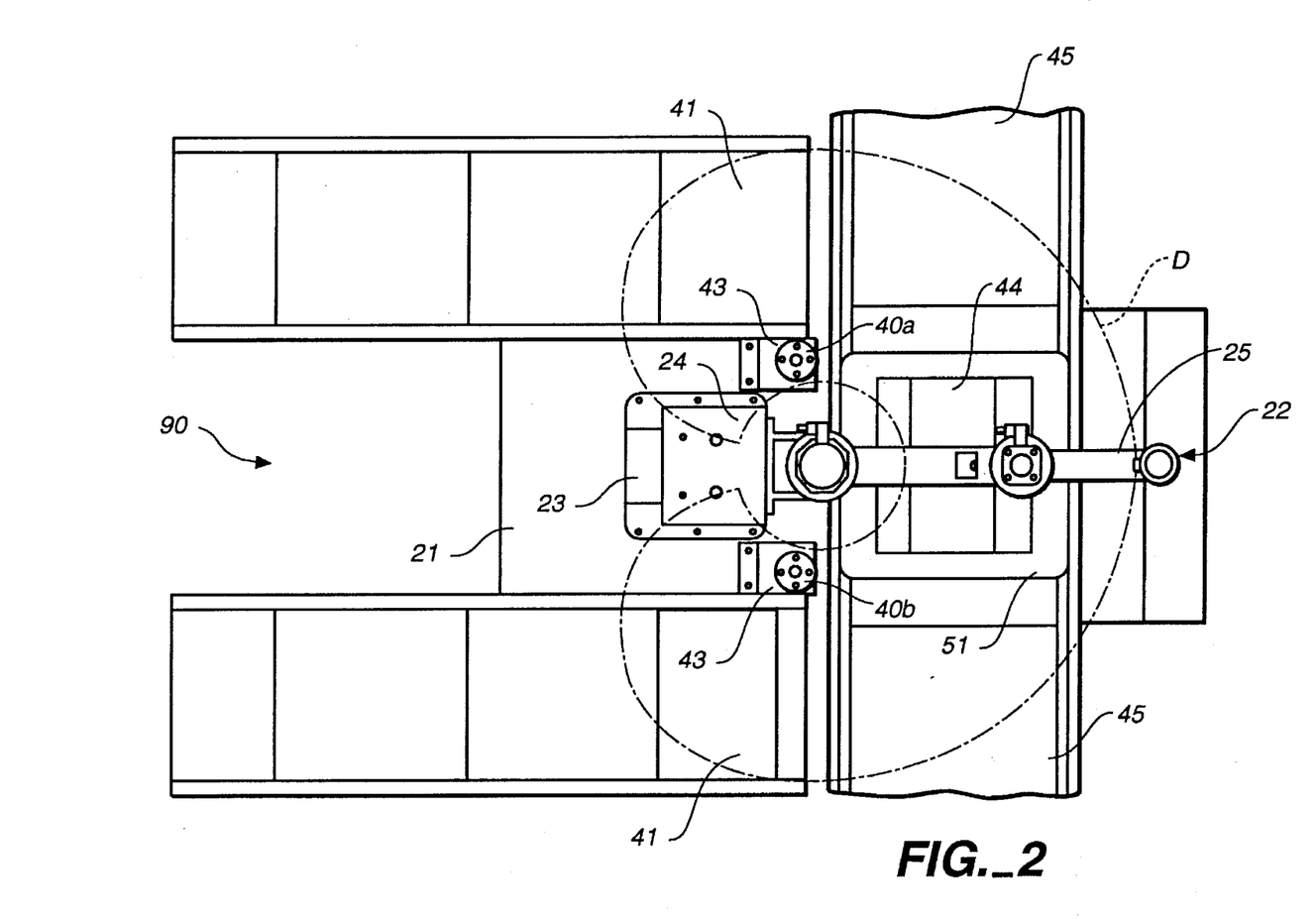
FIG. 2 is a plan view of the apparatus of FIG. 1.

FIGS. 1 and 2 show an apparatus 90 which may be used in a method embodying the present invention, having a base 21 supporting thereon a robot 22 of a cylindrical coordinate type. A vertical support shaft 23 is affixed to the base 21, and the robot 22 has its housing 24 supported by this vertical support shaft 23 so as to be movable vertically therealong. The housing 24 supports an arm mechanism 25 which can rotate only within a horizontal plane.

Figure 6:
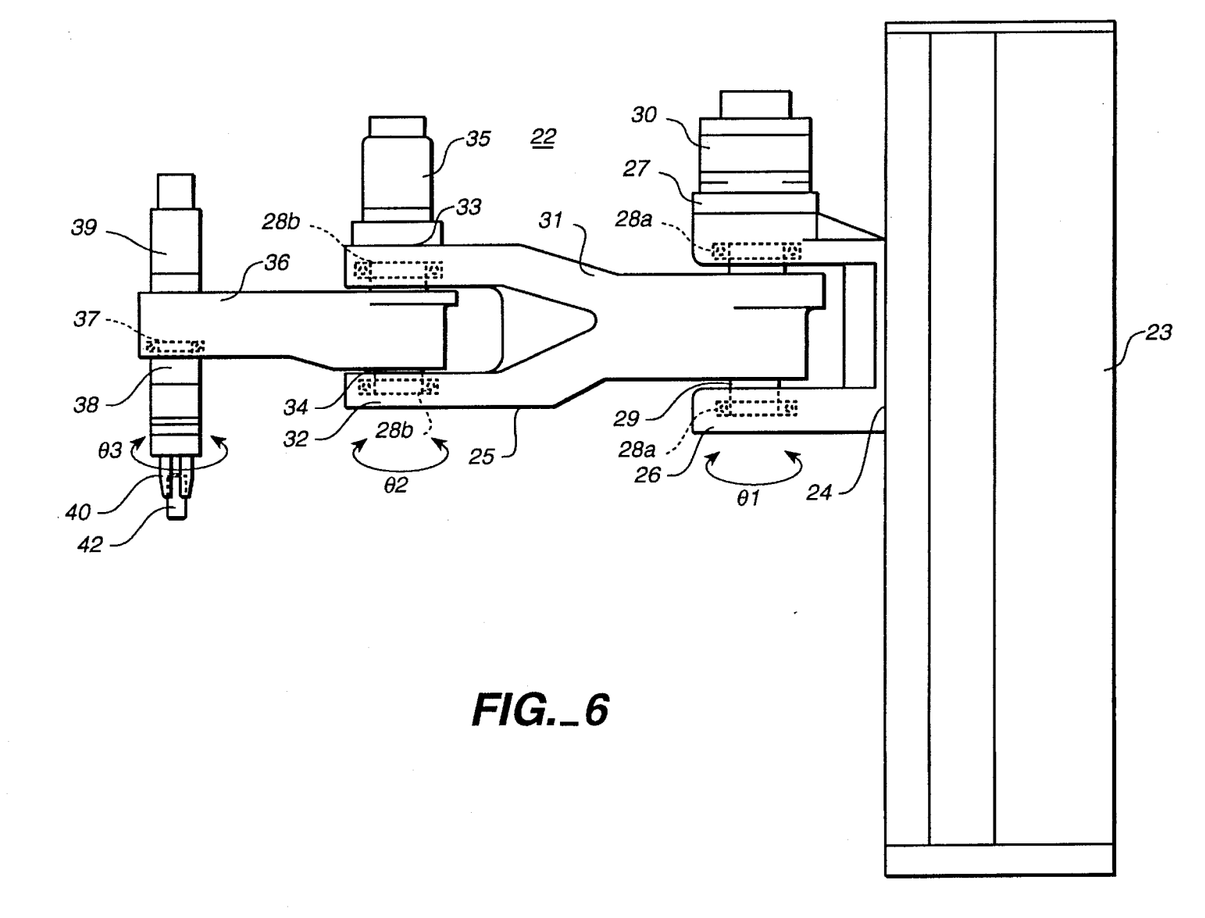
FIG. 6 is an enlarged side view of the robot.

As shown more in detail in FIG. 6, the robot 22 has a first joint member 26 protruding in the forward direction from its housing 24. A decelerator 27 is provided on the top surface of the first joint member 26 and is rotatable with a vertical rotary shaft 29 rotatably supported through a bearing 28a by the first joint member 26. A control motor 30, such as a servo motor, is affixed to the first joint member 26 and is connected to the shaft 29 through the decelerator 27. One end (or the proximal end) of a first horizontal arm 31 is affixed to the rotary shaft 29 such that the control motor 30 can cause the first arm 31 to rotate in the direction of 81. The other end (or the distal end) of the first arm 31 is formed as a second joint member 32. Another decelerator 33 is provided on the top surface of the second joint member 32 so as to be rotatable around another vertical rotary shaft 34 supported through a bearing 28b by the second joint member 32. Another control motor 35, such as a servo motor, is affixed to the second joint member 32 and is connected to the shaft 34 through the decelerator 33. One end (or the proximal end) of a second horizontal arm 36 is affixed to the rotary shaft 34 such that the control motor 35 can cause the second arm 36 to rotate in the direction of 82. The other end (or the tip) of the second arm 36 can thus be moved to any position within the area surrounded by the broken line D in FIG. 2 by rotating the first and second horizontal arms 31 and 36 by means of the control motors 30 and 35.

A tool-holder head 38, capable of attaching and detaching a tool and provided with an automatic tool-exchanging device such as a commercially available type of auto hand changer, is rotatably attached to the tip of the second arm 36 through a bearing 37. Still another control motor 39, such as a servo motor with a decelerator, is attached to the top surface of the tip of the second arm 36 and is connected to the tool-holder head 38 such that the head 38 can be rotated in the direction of 83 by means of the motor 39. An assembly tool 40 such as a mechanical hand is detachably attached to the tool-holder head 38 so as to be able to rotate in the direction of φ3 together with the head 38.

With reference back to FIG. 2, there are part-supply devices 41 disposed on both sides of the base 21 for bringing parts (shown at 42 in FIG. 1), which may be set on a pallet, into the area surrounded by the line D and hence reachable by the robot 22. If there are two of such part-supply devices 41 as shown in FIG. 2, at least two different kinds of parts can be supplied to the robot 22. Assembly tools 40a and 40b of different types are stored on a tool exchange table 43 situated between each of the part-supply devices 41 and the robot 22 so as to enable the tool-holder head 38 to selectively make use of an appropriate assembly tool 40 in accordance with the size and the shape of the part 42 to be handled.

Placed in front of the vertical support shaft 23 of the robot 22, there is a table device 51 for placing a workpiece 44 thereon. Conveyor belts 45 for transporting the workpiece 44 are disposed on both sides of the table device 51 so as to form a continuous path together with the table device 51.

Figure 3:
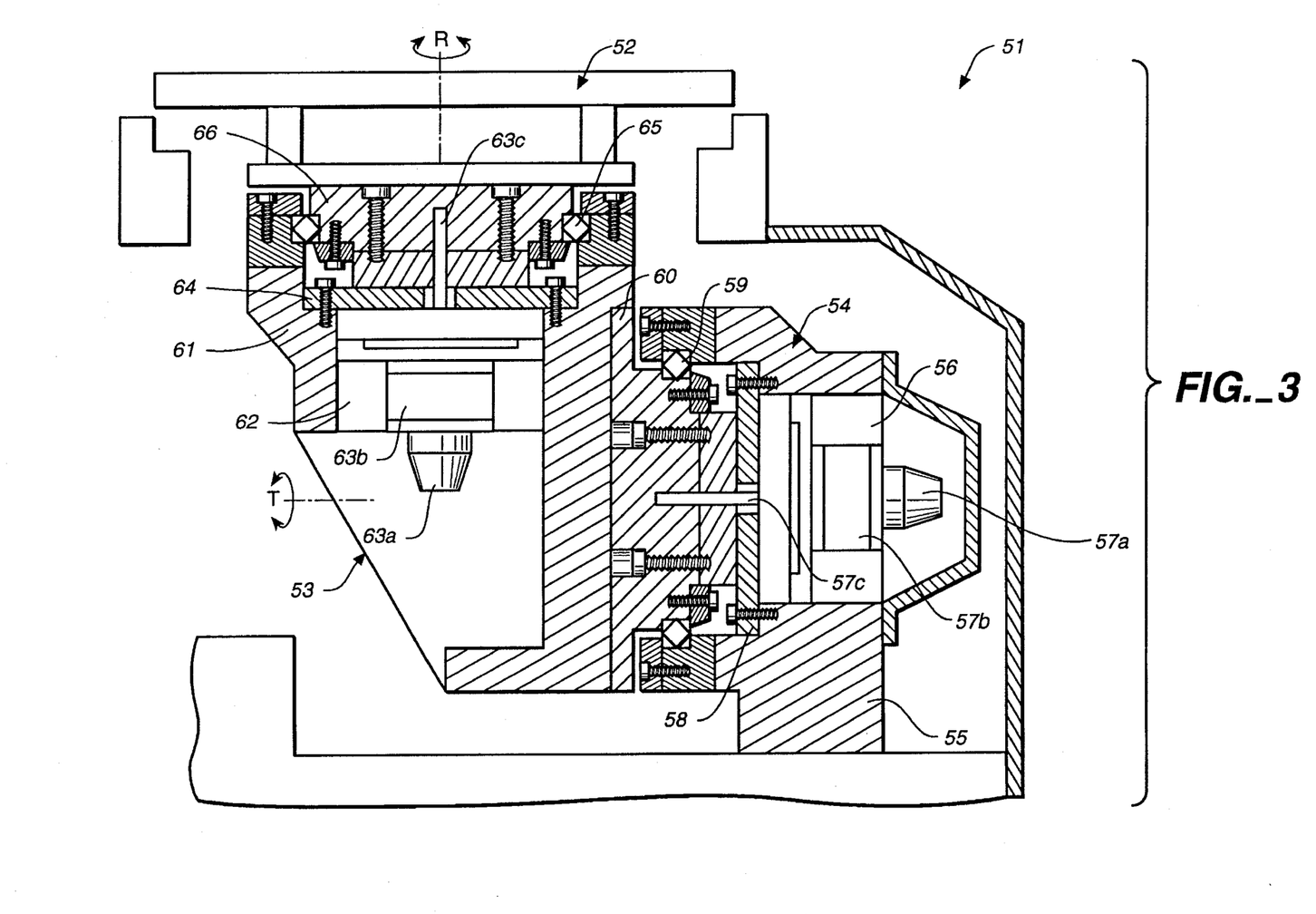
FIG. 3 is a sectional side view of the table device of FIGS. 1 and 2.
Figure 4:
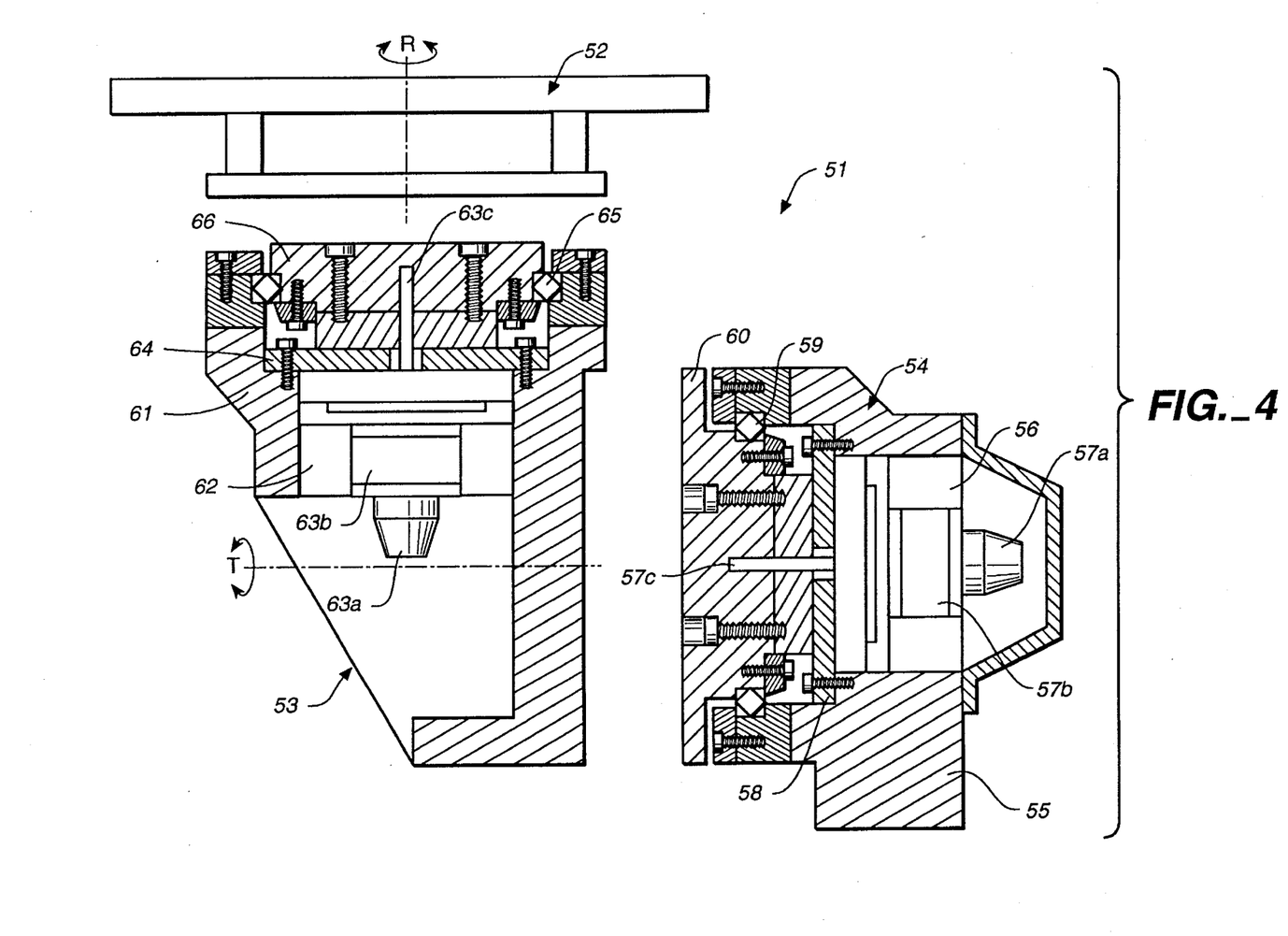
FIG. 4 is a partially exploded sectional side view of the table device of FIG. 3.

With reference next to FIG. 3, the table device 51 has a table 52 for placing a workpiece thereon, adapted to be universally rotatable around two mutually perpendicular axes. As can be seen more clearly in FIG. 4, the table device 51 is comprised of the table 52, a mobile unit 53 for rotating the table 52 around its center axis (referred to as the table-rotating axis R), and a fixed unit 54 for rotating the mobile unit 53 around a horizontal axis (referred to as the table-positioning axis T). A servo motor 57a for controlling the table-positioning is contained inside a motor room 56 of the housing 55 of the fixed unit 54 affixed to the base 21. Both the servo motor 57a and its decelerator 57b are affixed to a motor-supporting board 58 bolted to the fixed housing 55. A positioning-controlling rotary disk 60 is rotatably supported by the fixed housing 55 through a bearing 59. A servo motor 57a is connected to the positioning-controlling rotary disk 60 through the output shaft 57c of the decelerator 57b so as to be able to cause the disk 60 to rotate around the table-positioning axis T. As for the mobile unit 53, a servo motor 63a for rotating the table 52 with a decelerator 63b is contained inside a motor room 62 of a mobile casing 61, being affixed to a motor-supporting board 64 bolted to the mobile casing 61. The mobile casing 61 also supports a rotary disk 66 rotatably through a bearing 65, and the servo motor 63a is connected to this rotary disk 66 through the output shaft 63c of the decelerator 63b so as to be able to cause the disk 66 to rotate around the table-rotating axis R. The mobile unit 53 is affixed to the positioning-controlling rotary disk 60 such that the axis of rotation of the disk 66 (that is, the table-rotating axis R) is perpendicular to the axis of rotation of the position-controlling rotary disk 60 (that is, the table-positioning axis T). The table 52 is affixed to the rotary disk 66 of the mobile unit 53. Thus, as the servo motor 57a is operated to rotate the position-controlling rotary disk 60, the mobile unit 53 begins to rotate together, and the table-rotating axis R rotates around the table-positioning axis T. As the servo motor 63a is further operated to rotate the rotary disk 66, the table 52 is also rotated around the table-rotating axis R.

Figure 5A:
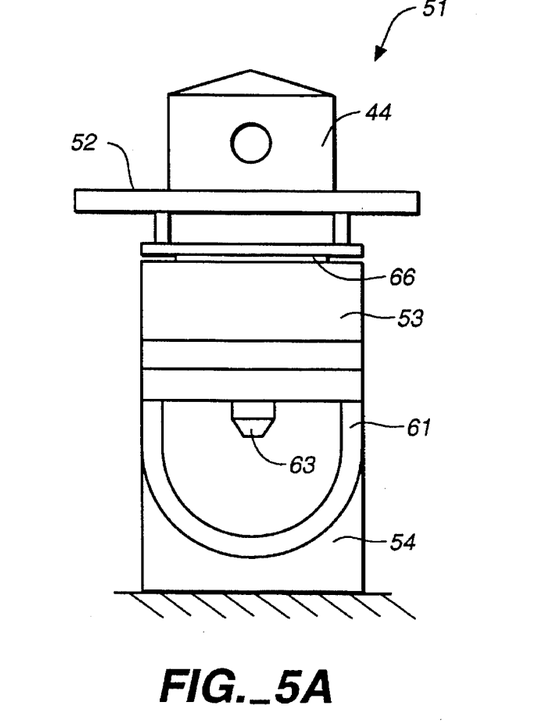
FIGS. 5(a) and 5(b) are schematic drawings of the table device of FIGS. 3 and 4 to show its operation.
Figure 5B:
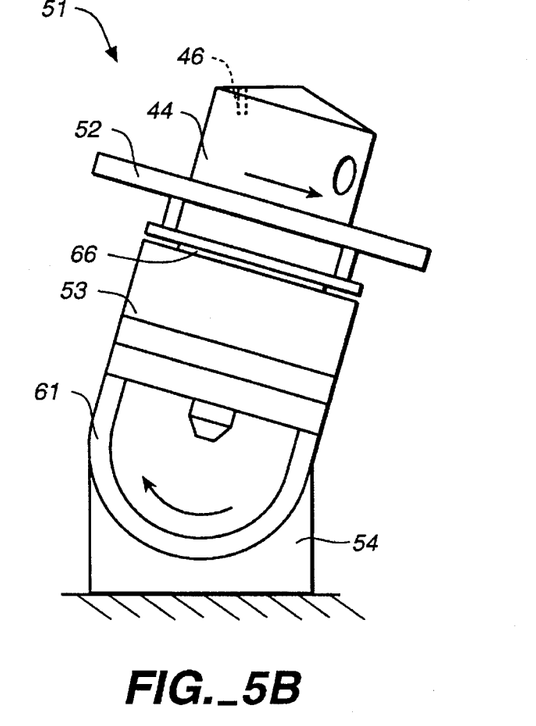

Structured as described above, the table device 51 is capable of causing the table 52 to rotate around both the table-positioning axis T and the table-rotating axis R by means of the two servo motors 57a and 63a so as to orient the workpiece 44 thereon in any desired direction. Suppose, for example, that the workpiece 44 on the table 52 was initially oriented as shown in FIG. 5(a). The table 52 is first rotated around the table-rotating axis R such that the hole 46 of interest becomes parallel to a plane perpendicular to the table-positioning axis T. Next, the mobile unit 53 is rotated around the table-positioning axis T such that the hole 46 becomes vertical as shown in FIG. 5(b). In this manner, any hole at any position can be oriented vertically.

Figure 7A:
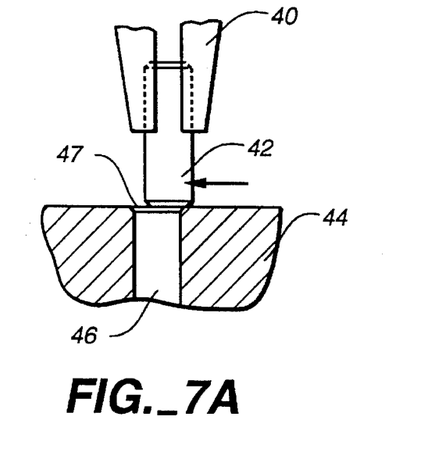
FIGS. 7(a) and 7(b) are schematic drawings of the insertion of a part by the robot.
Figure 7B:
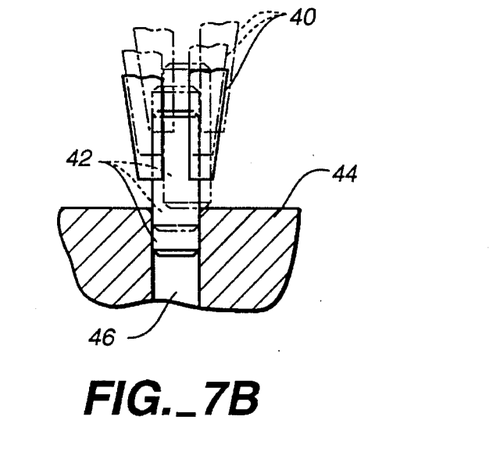

Next, the operation of the apparatus 90 for inserting a part 42 into the hole 46 will be described. A routine for the apparatus 90 is preliminarily determined by a teaching method or a memory method. The routine for attaching a part 42 onto the workpiece 44 may start by the delivery of the workpiece 44 by means of the conveyor 45. After the workpiece 44 is placed on the table 52, the table device 51 is rotated such that the first hole 46 to receive a part 42 becomes vertical. On the other hand, the arm mechanism 25 is lowered, an appropriate assembly tool 40 (40a or 40b) is attached to the tool-holder head 38 at its tip, and the part 42 to be inserted first is vertically grabbed by this tool 40 from a pallet or the like on the part-supply device 41. The arm mechanism 25 is then raised along the vertical support shaft 23 such that the part 42 is brought to a position above the hole 46. Thereafter, the arm mechanism 25 moves within a horizontal plane so as to position the part 42 at the hole 46 as shown in FIG. 7(a). This may be accomplished either by causing the part 42 to be moved to a position as preliminarily taught or by using a mechanical sensor or an optical sensor to detect the position of the hole 46. As the positions of the part 42 and the hole 46 are matched, the arm mechanism 25 as a whole is lowered along the vertical support shaft 23 while it is stopped. The part 42 is moved vertically by the force of the downward motion of the arm mechanism 25 as shown in FIG. 7(b), using tapered section 47 at the entrance of the hole 46 as a guide.

When the insertion of a part is thus completed, the table device 51 is activated again to orient the next hole 46 in the vertical direction. Thereafter, different assembly tools 40, 40a and 40b may be selected as needed, and the next part 42 is inserted to the vertically oriented hole 46. After all of the required parts have been inserted into their corresponding holes, the workpiece 44 is taken away from the table 52 onto the conveyor 45.

In summary, since no force is exerted on the arm mechanism 25 in the direction of its rotary motion when the part is inserted, the reaction at the time of the insertion can be absorbed by the joint members. Since the arm mechanism 25 is attached to the vertical support shaft 23 affixed to the base 21, furthermore, its mechanical rigidity can be increased as compared to the situation of deforming the arm mechanism of the robot for inserting a part 42. Accordingly, the insertion of parts can be accomplished more smoothly and the method of the present invention can also be used for press-fitting of a part into a hole. Moreover, since the assembly tools 40 are rotatable, it is possible not only to push a part straight into a hole but also to rotate it while pushing. Thus, the method of the present invention can be used for screwing a bolt into a correspondingly threaded hole.

Figure 8:
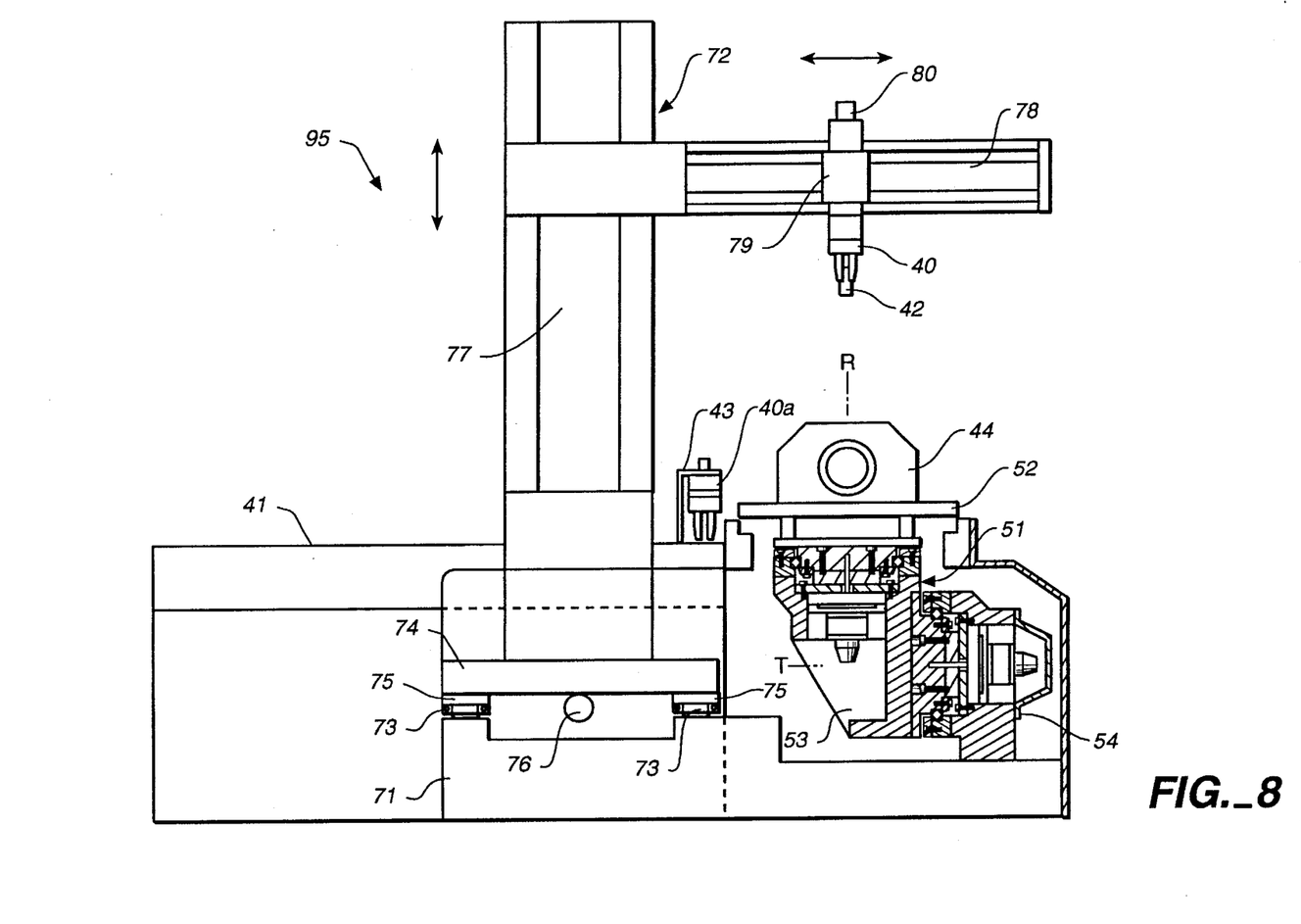
FIG. 8 is a partially sectional side view of another apparatus embodying the present invention.

FIG. 8 shows another apparatus 95 which may be used in a method embodying the present invention for robotically assembling parts, characterized as having on its base 71 a robot 72 of a rectilinear coordinate type. Two rails 73 are laid on the top surface of the base 71 perpendicularly to the direction of supply by the part-supply device 41, carrying thereon a supporting member 74, runners 75 attached to the bottom surface of the supporting member 74 slidably engaging the rails 73 such that the supporting member 74 can be moved sideways between the part-supply devices 41 by means of driving mechanism 76 such as comprising a screw bar. A vertical support shaft 77 is affixed to the supporting member 74, and a cantilevered horizontal shaft 78 is supported thereby, protruding therefrom in the forward direction (that is, to the right in FIG. 8), such that it can be moved vertically while maintaining its horizontal direction. A tool-holder head 79 for detachably attaching various assembly tools 40, 40a and 40b is supported by the horizontal shaft 78 so as to be slidable therealong in the direction of its extension. The tool-holder head 79 is adapted to rotate the attached tool 40 by means of a servo motor 80. In summary, the vertically movable horizontal shaft 78 controls the vertical motion while a two-dimensionally movable mechanism is formed by the tool-holder head 79 which can move longitudinally along the horizontal shaft 78 and the supporting member 74 adapted to move along the rails 73. In front of the robot 72 is a table device 51 as described above.

The apparatus 95 of FIG. 8, too, is adapted to operate the table device 51 first to orient the hole 46 in the workpiece 44 in the vertical direction, to move the head 79 and the supporting member 74 together to bring the part 42 held by the assembly tool 40 to the position of the hole 46, and then to insert the part 42 into the hole 46 by lowering the horizontal shaft 78 along the vertical support shaft 77.

The present invention has been described above by way of only a limited number of examples, but many modifications and variations are possible within the scope of the invention. According to the present invention, the part to be inserted is held vertically and hence can be held securely. This reduces the possibility of the part falling off the tool holder, and the parts can be dependably inserted into intended holes. Since it is only the elevator mechanism that is required to be operated for the insertion of a part, mechanisms of the assembly apparatus as well as the operation of its control system can be simplified. Positional adjustments of the tools are also simplified, and since the accuracy in insertion becomes much easier to attain, it becomes possible to carry out insertion process accurately and reliably. Moreover, since the reaction force at the time of insertion is perpendicular to any direction of motion of a two-dimensionally movable mechanism, even a large reaction force can be supported by the mechanism. Thus, methods according to the present invention can be used also for insertion into a tightly fitting hole or even for press-fitting. A still further advantage of the methods according to the present invention is that many parts of different sizes and shapes can be handled by a single unit of apparatus by detachably attaching different tools by means of an automatic tool-exchanging device of a known kind.

What is claimed is:

1. A method of robotically inserting an elongated machine part longitudinally into an elongated hole in a workpiece, said method comprising the steps of:

placing said workpiece on a table which is rotatable around at least two axes, said elongated hole being thereby positioned along a longitudinal axis that is oblique to the vertical direction;

rotating said table and thereby vertically orienting said hole;

holding said part vertically by an assembly tool;

operating a two-dimensionally moving mechanism adapted to move an object only within a horizontal plane and thereby moving said assembly tool horizontally and thereby positioning said part vertically above said hole whereat said part and said hole are vertically aligned on a common axis; and moving said two-dimensionally moving mechanism vertically by an elevator means for moving an object only in a vertical direction to thereby move said two-dimensionally moving mechanism vertically and causing said part to be inserted into said hole without causing any torque to be imparted on said part.

2. The method of claim 1 further comprising the step of detachably attaching said assembly tool to said two-dimensionally moving mechanism.

3. The method of claim 2 further comprising the step of providing an automatic tool-exchanging device fastened to said two-dimensionally moving mechanism, said assembly tool being caused to be detachably attached to said two-dimensionally moving mechanism automatically by said automatic tool-exchanging device.

4. The method of claim 1 further comprising the step of supporting said table by a table-supporting member rotatably around one of said two axes, said table-supporting member being rotatably supported around the other of said two axes.

5. The method of claim 1 wherein one of said at least two axes of said table is horizontal and said hole is vertically oriented by rotating said table around said horizontal axis.

* * * * *

UNITED STATES PATENT AND TRADEMARK OFFICE
CERTIFICATE OF CORRECTION

PATENT NO. : 5,566,436
DATED : October 22, 1996
INVENTOR(S) : Yasunari Hirata

It is certified that error appears in the above-indentified patent and that said Letters Patent is hereby corrected as shown below:

In Column 1, Line 11:
　　Replace　"This invention relates to a method of for assembling" with --This invention relates to a method of assembling--

In Column 2, Lines 39-41:
　　Replace　"fied and hence that a part can be reliably and it without developing torque on the part stably inserted into a hole or forcibly pressed into." with --fied and hence that a part can be reliably and stably inserted into a hole or forcibly pressed into it without developing torque on the part.--

UNITED STATES PATENT AND TRADEMARK OFFICE
CERTIFICATE OF CORRECTION

PATENT NO. : 5,566,436
DATED : October 22, 1996
INVENTOR(S) : Yasunari Hirata

It is certified that error appears in the above-indentified patent and that said Letters Patent is hereby corrected as shown below:

In Column 3, Line 58:
  Replace  "first arm 31 to rotate in the direction of 81. The other end (or" with --first arm 31 to rotate in the direction of $\theta 1$. The other end (or--

In Column 4, Line 2:
  Replace  "in the direction of 82. The other end (or the tip) of the second" with --in the direction of $\theta 2$. The other end (or the tip) of the second--

UNITED STATES PATENT AND TRADEMARK OFFICE
CERTIFICATE OF CORRECTION

PATENT NO. : 5,566,436
DATED : October 22, 1996
INVENTOR(S) : Yasunari Hirata

It is certified that error appears in the above-indentified patent and that said Letters Patent is hereby corrected as shown below:

In Column 4, Line 15:
Replace  "in the direction of $\theta 3$ by means of the motor 39. An assembly" with --in the direction of $\theta 3$ by means of the motor 39. An assembly--

In Column 4, Line 18:
Replace  "direction of $\theta 3$ together with the head 38." with --direction of $\theta 3$ together with the head 38.--

Signed and Sealed this

Eighth Day of April, 1997

BRUCE LEHMAN

Commissioner of Patents and Trademarks